(12) United States Patent
Tomida

(10) Patent No.: US 7,649,984 B2
(45) Date of Patent: Jan. 19, 2010

(54) COMMUNICATION DEVICE

(75) Inventor: Wataru Tomida, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1183 days.

(21) Appl. No.: 10/928,205

(22) Filed: Aug. 30, 2004

(65) Prior Publication Data

US 2005/0046906 A1 Mar. 3, 2005

(30) Foreign Application Priority Data

Aug. 29, 2003 (JP) .............................. 2003-307229

(51) Int. Cl.
- *H04M 11/00* (2006.01)
- *H04N 1/36* (2006.01)
- *H04N 1/00* (2006.01)

(52) U.S. Cl. .............................. 379/93.01; 379/100.01; 358/400; 358/405; 358/407; 358/412

(58) Field of Classification Search ................. 358/412, 358/405, 400, 434, 426.07, 407; 379/93.01, 379/100.01, 100.16, 93.11, 373.01, 93.05, 379/93.09, 100.02, 102.02

See application file for complete search history.

(56) References Cited

U.S. PATENT DOCUMENTS

| | | | | |
|---|---|---|---|---|
| 4,549,221 A | * | 10/1985 | Yamamoto et al. | 358/426.07 |
| 5,691,820 A | * | 11/1997 | Komatsu | 358/434 |
| 6,317,224 B1 | * | 11/2001 | Lutgen et al. | 358/412 |
| 6,825,954 B1 | * | 11/2004 | Nakamura | 358/400 |
| 2003/0214678 A1 | * | 11/2003 | Shibata et al. | 358/405 |

FOREIGN PATENT DOCUMENTS

| | | |
|---|---|---|
| JP | 61-18895 | 5/1986 |
| JP | 2-63266 | 3/1990 |
| JP | 6-164762 | 6/1994 |
| JP | 6-205193 | 7/1994 |
| JP | 6-225114 | 8/1994 |
| JP | 9-23327 | 1/1997 |
| JP | 10-308864 | 11/1998 |
| JP | 11-85647 | 3/1999 |
| JP | 2000-101771 | 4/2000 |
| JP | 2000-165537 | 6/2000 |
| JP | 2000-349930 | 12/2000 |
| JP | 2001-8015 | 1/2001 |
| JP | 2001-36715 | 2/2001 |
| JP | A-2001-238027 | 8/2001 |
| JP | 2001-256158 | 9/2001 |
| JP | 2001-326778 | 11/2001 |
| JP | 2001-346023 | 12/2001 |

* cited by examiner

*Primary Examiner*—Thjuan K Addy
(74) *Attorney, Agent, or Firm*—Oliff & Berridge, PLC

(57) ABSTRACT

There is provided a communication device, which is provided with a target time setting system that sets a determination target time to a time at which a predetermined setting operation is performed, and a determining system that determines whether the determination target time is within a certain transmittable time period. The communication device is further provided with a transmission time setting system that sets a transmission start time to the determination target time when the determination target time is within the certain transmittable time period, and shifts the determination target time so that the determination target time is within the certain transmittable time period when the determination target time is not within the certain transmittable time period, and a transmitting system that starts to communicate with a external device through a network at the transmission start time.

22 Claims, 7 Drawing Sheets

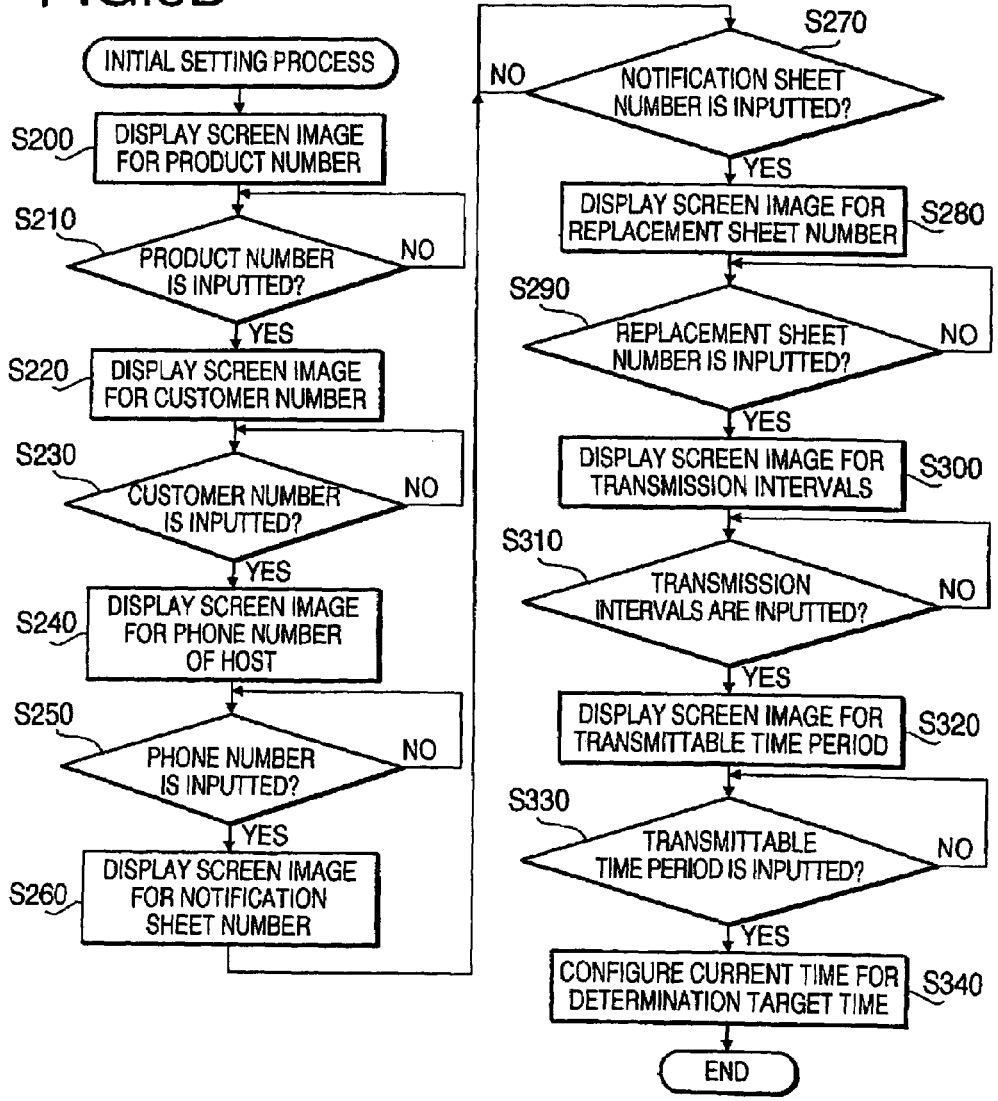

| LENGTH OF TRANSMITTABLE TIME PERIOD (h) | ADDITION TIME t1 | ADDITION TIME t2 | ADDITION TIME t3 |
|---|---|---|---|
| ... | ... | ... | ... |
| 8 | 16 | 8 | |
| 7 | 17 | 10 | |
| 6 | 18 | 12 | 9 |
| ... | ... | ... | ... |

COMMUNICATION DEVICE

BACKGROUND OF THE INVENTION

The present invention relates to a communication device configured to communicate with a host device.

A centralized management system for managing facsimile devices is proposed. Japanese Patent Provisional Publication No. 2000-101771 discloses such a centralized management system. In the system, a facsimile device automatically transmits management information, such as a failed state or usage conditions of consumable items, to a host device via a telephone line. The host device receives the management information from a plurality of facsimile devices via the telephone line.

Each of the plurality of facsimile devices automatically transmits the management information to the host device at a preprogrammed time set by a user.

SUMMARY OF THE INVENTION

One of problems caused in the above mentioned centralized management system is that data transmissions from the facsimile devices to the host device are centered on a specific time and thereby a telephone traffic jam occurs. If such a telephone traffic jam occurs, some facsimile devices can not transmit management information to the host device at the preprogrammed times.

The reason why such a problem occurs is that many users set a transmission time (at which the facsimile device transmits the management information) for the hour within a low phone rate period.

Possibility of normal data transmission between the facsimile device and the host device may increase if the facsimile device is configured such that when the phone line is busy, the facsimile device resends the management information after a certain time period is elapsed. However, in this case, the processes to be executed by the facsimile device are increased.

Even if the facsimile device is configured to automatically transmit the management information at a preset time without requesting the user to preprogram the transmission time, the similar problem may occur. That is, in this case, data transmissions from the facsimile devices to the host device are also centered on a start time of a certain time period.

The above mentioned problem may occur in various type of communication devices configured to transmit management information to a host device.

The present invention is advantageous in that it provides a communication device capable of preventing centralization of data transmissions between a host device and communication devices.

According to an aspect of the invention, there is provided a communication device connected to a network. The communication device is provided with a target time setting system that sets a determination target time to a time at which a predetermined setting operation is performed, and a determining system that determines whether the determination target time is within at least one certain transmittable time period. The communication device is further provided with a transmission time setting system that sets a transmission start time to the determination target time when the determining system determines that the determination target time is within the certain transmittable time period, and shifts the determination target time so that the determination target time is within the certain transmittable time period when the determining system determines that the determination target time is not within the certain transmittable time period, and a transmitting system that starts to communicate with a external device through the network at the transmission start time.

With this configuration, it is prevented that data transmissions from the communication devices to the external device are centered on a specific time. The communication between the communication device and the external device can be reliably completed.

Optionally, when the determining system determines that the determination target time is not within the certain transmittable time period, the transmission time setting system may operate to add and/or subtract a time value to and/or from the determination target time so that the determination target time is within the certain transmittable time period.

Still optionally, when the determining system determines that the determination target time is not within the certain transmittable time period, the transmission time setting system may repeat following time shifting operations: (a1) selecting one of predetermined time values; (a2) adding and/or subtracting the selected one of the predetermined time values to and/or from the determination target time to obtain a changed determination target time; and (a3) passing the changed determination target time to the determining system to determine whether the changed determination target time is within the certain transmittable time period. In this case, when the changed determination target time is within the certain transmittable time period, the time shifting operations are stopped.

Still optionally, the predetermined time values may include a plurality of time values having different lengths. In the time shifting operations, the predetermined time values are selected in decreasing order of length of time.

Still optionally, the predetermined time values may be related to a length of the certain transmittable time period.

Still optionally, the predetermined time values may be prepared for each of various lengths of certain transmittable time periods.

In a particular case, when communication between the transmitting system and the external device is not successfully completed, the transmitting system may retry to communicate with the external device after a certain time is elapsed.

Optionally, when the communication between the transmitting system and the external device is successfully completed after the certain time is elapsed, the transmitting system may change the transmission start time to a time at which the communication is successfully completed.

Still optionally, the transmitting system may operate so that the changed transmission start time is within the certain transmittable time period.

In a particular case, the predetermined setting operation may include a initial setting operation for entering initial settings into the communication device.

In a particular case, the certain transmittable time period may be entered by a user into the communication device.

In a particular case, the certain transmittable time period may be preprogrammed in the communication device.

In a particular case, the transmitting system may transmit management information to the external device.

Optionally, the communication device may include a facsimile device, and the management information may include usage conditions of consumable items and/or exchangeable components of the facsimile device.

In a particular case, the network may include a telephone line.

In a particular case, the certain transmittable time period may include a low phone rate period.

According to another aspect of the invention, there is provided a computer implemented method of communicating with an external device. The method includes the steps of setting a determination target time to a time at which a predetermined setting operation is performed, determining whether the determination target time is within a certain transmittable time period, setting a transmission start time to the determination target time when it is determined in the determining step that the determination target time is within the certain transmittable time period, shifting the determination target time so that the determination target time is within the certain transmittable time period when it is determined in the determining step that the determination target time is not within the certain transmittable time period, and starting to communicate with the external device through the network at the transmission start time.

With this configuration, it is prevented that data transmissions from communication devices to the external device are centered on a specific time. The communication between the communication device and the external device can be reliably completed.

According to another aspect of the invention, there is provided a computer program product including a computer program to be executed by a computer to achieve a method of communicating with an external device. The method includes the steps of setting a determination target time to a time at which a predetermined setting operation is performed, determining whether the determination target time is within a certain transmittable time period, setting a transmission start time to the determination target time when it is determined in the determining step that the determination target time is within the certain transmittable time period, shifting the determination target time so that the determination target time is within the certain transmittable time period when it is determined in the determining step that the determination target time is not within the certain transmittable time period, and starting to communicate with the external device through the network at the transmission start time.

With this configuration, it is prevented that data transmissions from communication devices to the external device are centered on a specific time. The communication between the communication device and the external device can be reliably completed.

With regard to the above mentioned two aspects of the invention of the method and computer program, the shifting step may include time shifting operations of selecting one of predetermined time values, adding and/or subtracting the selected one of the predetermined time values to and/or from the determination target time to obtain a changed determination target time, and passing the changed determination target time to the determining step to determine whether the changed determination target time is within the certain transmittable time period. The time shifting operations are performed when it is determined in the determining step that the determination target time is not within the certain transmittable time period. When the changed determination target time is within the certain transmittable time period, the time shifting operations are stopped.

Still optionally, the predetermined time values may include a plurality of time values having different lengths. In this case, in the time shifting operations, the predetermined time values may be selected in decreasing order of length of time.

BRIEF DESCRIPTION OF THE ACCOMPANYING DRAWINGS

FIG. 3A is a flowchart illustrating a transmission start time setting process;

FIG. 3B is a flowchart illustrating an initial setting process performed in a step of the transmission start time setting process of FIG. 3A;

DETAILED DESCRIPTION OF THE EMBODIMENTS

Figure 1A:
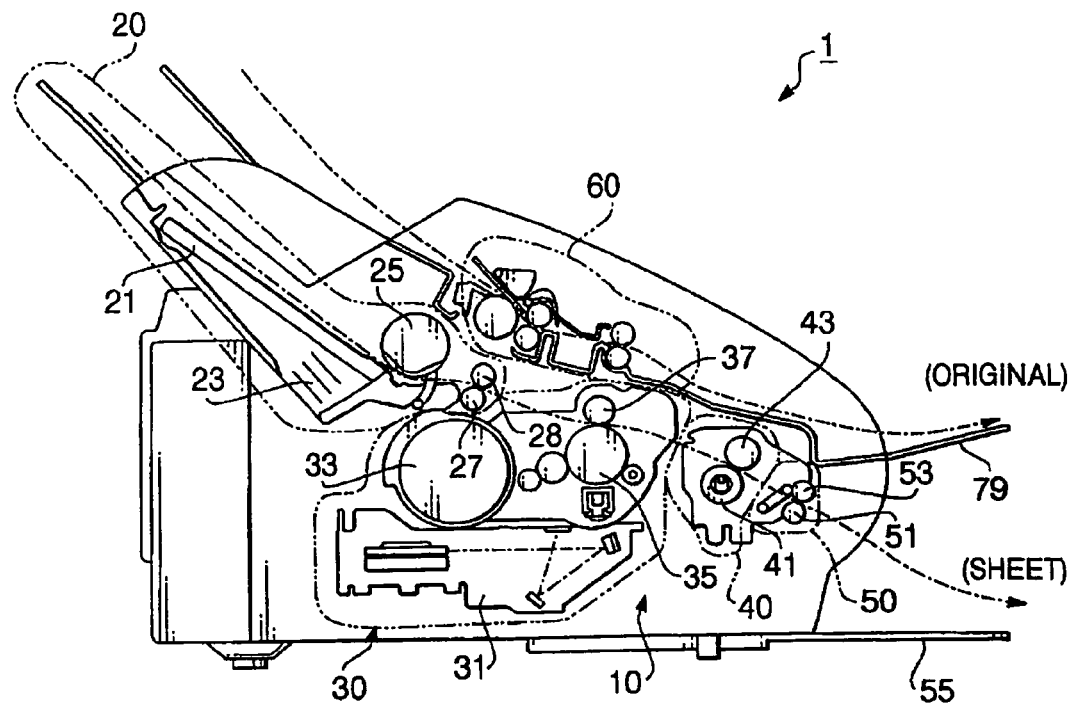
FIG. 1A is a cross sectional view of a facsimile device according to an embodiment of the invention illustrating an internal configuration of the facsimile device.
Figure 1B:
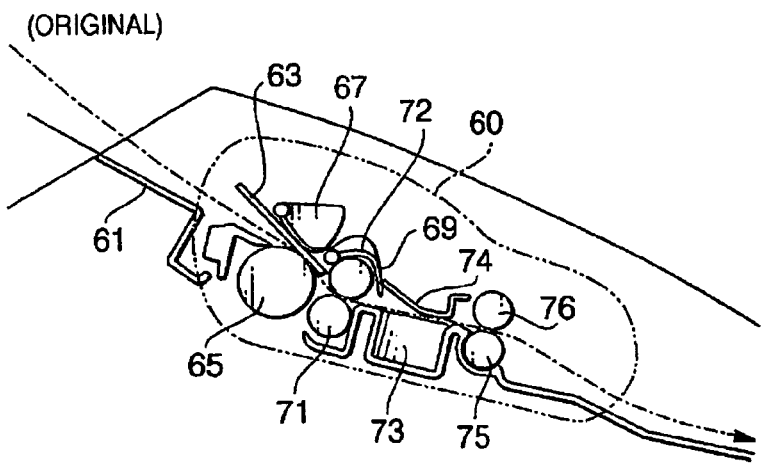
FIG. 1B is a cross sectional view of a scanner unit of the facsimile device.

FIG. 1A is a cross sectional view of a facsimile device 1 illustrating in detail an internal configuration of the facsimile device 1. As shown in FIG. 1A, the facsimile device 1 includes a printing unit 10 and a scanner unit 60. FIG. 1B is a cross sectional view of the scanner unit 60.

As shown in FIGS. 1A and 1B, the printing unit 10 includes a sheet feeder 20, an image forming unit 30, a fixing unit 40, a sheet ejection mechanism 50. The facsimile device 1 further includes a control unit 80 (see FIG. 2) which controls various units in the facsimile device 1 to form an image on a sheet based on image data transmitted from an external facsimile device.

The sheet feeder 20 includes a sheet tray 21 on which a stack of sheets are placed. A top sheet on the sheet tray 21 is pressed against a feed roller 25 by force exerted by a spring 23, so that the top sheet is separated and is fed into the inside of the facsimile device 1 when the feed roller rotates. The sheet fed into the inside of the facsimile device 1 by the feed roller 25 is then carried to a pair of registration rollers 27 and 28 located along a sheet carrying path.

The registration rollers 27 and 28 operate to carry the sheet to a transferring position between a photoconductive drum 35 and a transferring roller 37 at a predetermined timing.

The image forming unit 30 includes a beam scanning unit 31 having a laser source, a toner cartridge 33 accommodating toner, the photoconductive drum 35, and the transferring roller 37. The image forming unit 30 operates under control of the control unit 80 to illuminate the photoconductive drum 35 with a laser beam from the beam scanning unit 31 so that a latent image based on a facsimile image transmitted to the facsimile device 1 is formed on the photoconductive drum 35.

The image forming unit 30 operates to develop the latent image formed on the photoconductive drum 35 by the toner, and to transfer the developed image to the sheet carried to the transferring position between the photoconductive drum 35 and the transferring roller 37. By the rotation of the transferring roller 37, the sheet on which the image (toner image) is formed is carried to the fixing unit 40.

The fixing unit 40 is located along the sheet carrying path, downstream from the photoconductive drum 35 and the transferring roller 37. The fixing unit 40 includes a heat roller 41 and a press roller 43. The sheet carried from the image forming unit 30 to the fixing unit 40 is heated and pressed by the heat roller 41 and the press roller 43 while the sheet is carried toward the sheet ejection mechanism 50. Thus, the toner image is fixed on the sheet.

The sheet ejection mechanism 50 is located along the sheet carrying path, downstream from the fixing unit 40. The sheet ejection mechanism 50 includes a pair of ejecting rollers 51 and 53 which rotate to eject the sheet to an ejection tray 55.

As shown in FIG. 1B, the scanner unit 60 includes a stacker 61, an automatic document feeder (ADF) section 63, a separation roller 65, an original leading end detection sensor 67, an original width sensor 69, a press roller 71, and a feed roller 72. The scanner unit 62 further includes a contact image scanner (CIS) unit 73, a pressing plate 74, and a pair of ejection rollers 75 and 76.

The scanner unit 60 includes an original carrying mechanism driving unit 77 (see FIG. 2) that operates to drive the scanner unit 60. When a user command for transmitting data of an original (placed on the stacker 61) is inputted to the facsimile device 1, the original carrying mechanism driving unit 77 drives, under control of the control unit 80, the above various units in the scanner unit 60 to read the original and generates image data of the original.

More specifically, in the scanner unit 60, originals are stacked on the stacker 61 while the right side of each original facing toward the stacker 61. A bottom one of the stacked originals on the stacker 61 is pressed against the separation roller 65 by the ADF section 63. In this situation, the separation roller 65 is rotated so that the bottom one of the originals is separated from the stacker 61 one by one and is fed into the inside of the scanner unit 60.

When the original is fed by the ADF section 63 to the inside of the scanner unit 60, a leading end of the original is detected by the sensor 67 to hold the original at a predetermined feeding position temporarily. The original held at the predetermined feeding position is carried to a position between the press roller 71 and the feed roller 72, and then is carried to the CIS unit 73.

The CIS unit 73 includes a reading surface formed by glass, LEDs (light emitting diodes) arranged inside of the CIS unit 73, and an image sensor for converting an image formed thereon to an electric signal. When the original is illuminated with light which is emitted from the LEDs and passed through the reading surface, reflected light from the original forms the image on the image sensor, and the electric signal of the image is generated by the image sensor.

When the original is carried to the CIS unit 73, the original is pressed by the pressing plate 74 against the reading surface (glass plate) to read the original and to generate image data. The thus obtained image data is then sent to the control unit 80.

Then, the original is carried to the ejection rollers 75 and 76 to eject the original to a tray 79. The above various types of rollers in the scanner unit 60 are driven by a motor provided in the original carrying mechanism driving unit 77.

In the vicinity of the feed roller 72, the original width sensor 69 is located. The original width sensor 69 detects the width (i.e., the size) of the original being carried between the press roller 71 and the feed roller 72. The detection result of the sensor 69 is sent to the control unit 80. Further, the sensor 69 is configured to detect a trailing end of the original. In the scanner unit 60, the carrying operation is controlled by using the detection results of the sensor 69.

Figure 2:
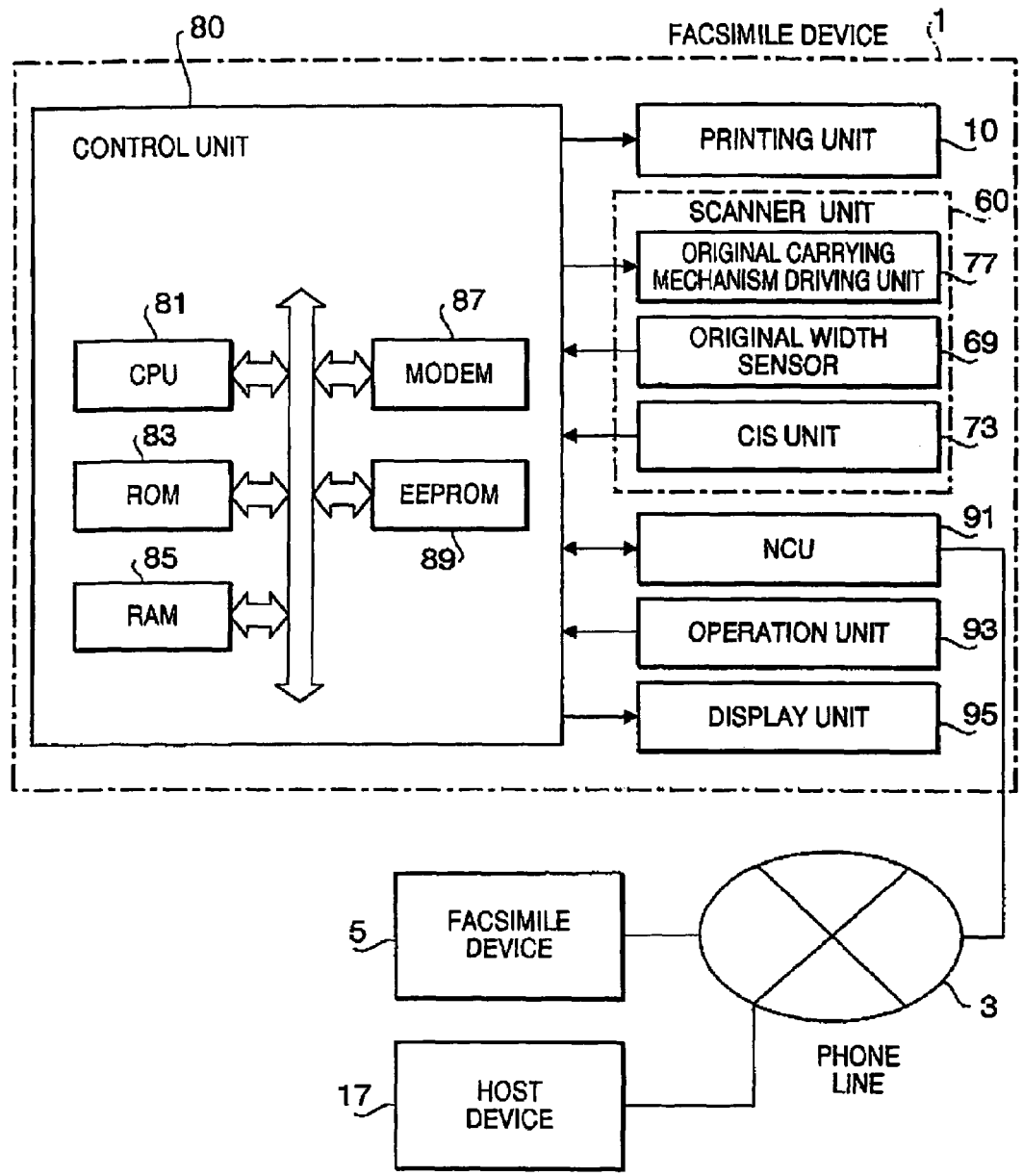
FIG. 2 is a functional block diagram of the facsimile device.

Next, functions of the facsimile device 1 will be described with reference to FIG. 2. FIG. 2 is a functional block diagram of the facsimile device 1. As shown in FIG. 2, the facsimile device 1 includes the control unit 80, the printing unit 10, the scanner unit 60, an NCU (network control unit) 91, an operation unit 93, a display unit 95. The control unit 80 includes a CPU (central processing unit) 81, a ROM (read only memory) 83, a RAM (random access memory) 85, an EEPROM 89, and a modem 87. The modem 87 is used to communicate with external devices such as an external facsimile device 5 or a host device 17 via telephone lines 3.

Figures 4A, 4B:
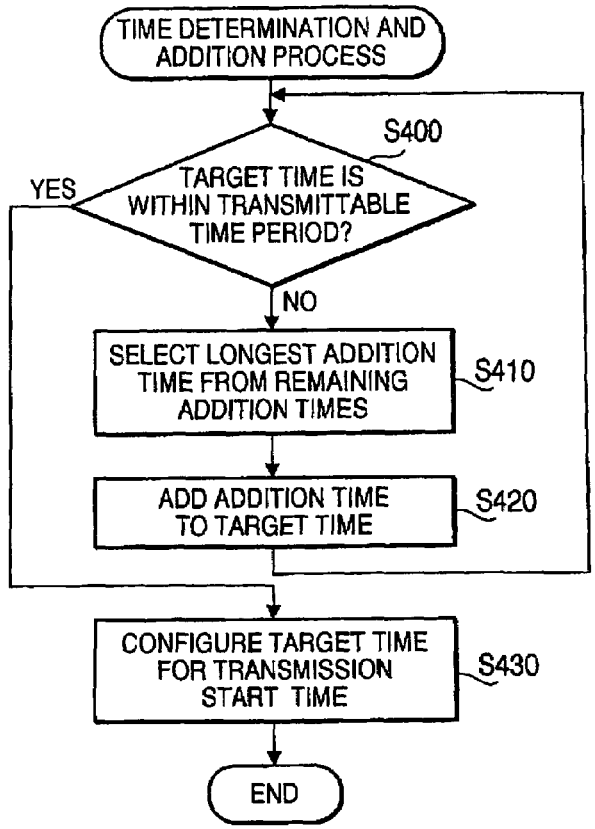
FIG. 4A is a flowchart illustrating a time determination and addition process performed in a step of the transmission start time setting process of FIG. 3A.
FIG. 4B shows a table of addition times stored in a ROM provided in the facsimile device.

In the ROM 83, various programs and settings defining operation of the facsimile device 1 are stored. In the ROM 83, time values to be used in a time determination and addition process which is described in detail later with reference to FIG. 4B is also stored. In the EEPROM 89, address information of the external devices such as telephone numbers is stored. The RAM 85 is used when the CPU 81 executes the program stored in the ROM 83.

The modem 87 operates to convert a digital signal of facsimile data to an analog signal to transmit the facsimile data to the external device via the telephone lines 3, and operates to convert a signal from the external device obtained via the NCU 91 to a digital signal.

The operation unit 93 connected to the control unit 80 includes key switches which are used by a user to input various types of commands or settings. The display unit 95 connected to the control unit 80 includes, for example, a LCD (liquid crystal display). The display unit 95 is used to notify the user of information and to make settings. The facsimile device 1 further includes a speaker and a handset (not shown)

The CPU 81 uses the modem 87 and the NCU 91 to communicate with the external device via the telephone lines 3. The CPU 81 transmits and receives facsimile data in accordance with a facsimile protocol of ITU-T standards. As described in detail later with reference to FIG. 5, the control unit 80 is configured to transmit management information including the number of printed sheets and usage conditions of the toner cartridge 33 to the host device 17 via the telephone lines 3.

FIG. 3A is a flowchart illustrating a transmission start time setting process executed under control of the CPU 81. FIG. 3B is a flowchart illustrating an initial setting process performed in step S100 of the transmission start time setting process. FIG. 4A is a flowchart illustrating a time determination and addition process performed in step S110 of the transmission start time setting process. As described below, by inputting various settings into the facsimile device 1 in the initial setting process, a determination target time (i.e., a transmission start time) is automatically configured without requesting the user to input time values of the determination target time.

The transmission start time setting process is initiated when power of the facsimile device 1 is turned on first or when the user performs a predetermined operation using the operation unit 93. As shown in FIG. 3A, when the transmission start time setting process is initiated, the initial setting process is performed (step S100). Next, the time determination and addition process is performed (step S110).

As shown in FIG. 3B, when the initial setting process is initiated, a screen image for inputting a product number is displayed on the display unit 95 (step S200). In step S200, the user can input the product number using the operation unit 93. The product number is a number for uniquely identifying each facsimile device.

Next, in step S210, it is determined whether the product number is inputted by the user or not. When the product number is not inputted (S210:NO), step 210 is repeated. When the product number is inputted (S210:YES), control proceeds to step S220.

In step S220, a screen image for inputting a customer number to the facsimile device 1 is displayed on the display unit 95. In step S220, the user can input the customer number using the operation unit 93. The customer number is a number for uniquely identifying each customer (i.e., the user). Next, in step S230, it is determined whether the customer number is inputted by the user or not. When the customer number is not inputted (S230:NO), step 230 is repeated. When the customer number is inputted (S230:YES), control proceeds to step S240.

In step S240, a screen image for inputting a telephone number of the host device 17 to the facsimile device 1 is displayed on the display unit 95. In step S240, the user can input the telephone number using the operation unit 93. Next, in step S250, it is determined whether the telephone number is inputted by the user or not. When the telephone number is not inputted (S250:NO), step 250 is repeated. When the telephone number is inputted (S250:YES), control proceeds to step S260.

In step S260, a screen image for inputting the number of printed sheets for notifying the host device 17 (hereafter, referred to as a notification sheet number) is displayed on the display unit 95. When the number of sheets printed in the facsimile device 1 reaches the notification sheet number, the facsimile device 1 notifies the host device 17 of a fact that the number of sheets printed in the facsimile device 1 reaches the notification number. In step S260, the user can input the notification sheet number to the facsimile device 1 using the operation unit 93. Next, in step S270, it is determined whether the notification sheet number is inputted by the user or not. When the notification sheet number is not inputted (S270:NO), step 270 is repeated. When the telephone number is inputted (S270:YES), control proceeds to step S280.

In step S280, a screen image for inputting the number of printed sheets indicating timing of replacement of the photoconductive drum 35 (hereafter, referred to as a replacement sheet number) is displayed on the display unit 95. In step S290, the user can input the replacement sheet number to the facsimile device 1 using the operation unit 93. Next, in step S290, it is determined whether the replacement sheet number is inputted by the user or not. When the replacement sheet number is not inputted (S290:NO), step 290 is repeated. When the telephone number is inputted (S290:YES), control proceeds to step S300.

In step S300, a screen image for inputting the time intervals at which the facsimile device 1 transmits the management information to the host device 1 (hereafter, referred to as transmission intervals) is displayed on the display unit 95. In step S300, the user can input the transmission intervals to the facsimile device 1 using the operation unit 93. Next, in step S310, it is determined whether the transmission intervals are inputted by the user or not. When the transmission intervals are not inputted (S310:NO), step 310 is repeated. When the transmission intervals are inputted (S310:YES), control proceeds to step S320.

In step S320, a screen image for inputting a time period during which the transmission of the management information to the host device 17 is allowed (hereafter, referred to as a transmittable time period) is displayed on the display unit 95. In step S320, the user can input the transmittable time period to the facsimile device 1 using the operation unit 93. Next, in step S330, it is determined whether the transmittable time period is inputted by the user or not. When the transmittable time period is not inputted (S330:NO), step 330 is repeated. When the transmittable time period is inputted (S330:YES), control proceeds to step S340.

In step S340, a current time is determined as a determination target time used in the time determination and addition process shown in FIG. 4A. Then, the initial setting process terminates.

Next, the time determination and addition process performed in step S110 will be described with reference to FIG. 4A. Firstly, in step S400, it is determined whether the determination target time set in step S340 is within the transmittable time period. When the determination target time is within the transmittable time period (S400:YES), control proceeds to step S430. When the determination target time is not within the transmittable time period (S400:NO), control proceeds to step S410.

In step S410, one of a plurality of kinds of addition times stored in the ROM 83 is selected. Then, the sum of the selected addition time and the determination target time is newly determined as the determination target time (S420) to repeat the process from step S400. FIG. 4B shows a table of the addition times stored in the ROM 83. As shown in FIG. 4B, in this embodiment, three kinds of addition times (addition time t1, addition time t2, addition time t3) are prepared for each of a plurality of lengths of the transmittable time periods. The additional times are selected in decreasing order of length of time. That is, the addition time t1 has the highest priority.

For example, when the transmittable time period set in step 320 is six hours raging from 10 p.m. to 4 a.m., the addition time t1 of 18 hours is firstly selected in step S410. When the step S410 is performed next time, the addition time t2 of 12 hours is selected. When the step S410 is performed for a third time, the addition time t3 of 9 hours is selected.

For each of lengths of transmittable time periods, the three kinds of addition times are determined such that when steps S400-S420 are repeated at least three times, the determination target time is necessarily included in the transmittable time period. In FIG. 4B, only two kinds of addition times are prepared for the length of transmittable time period of 8 hours or 7 hours because by using the two kinds of addition times shown in FIG. 4B, the determination target time processed in steps of S400-S420 is necessarily included in the transmittable time period.

In step S430, the determination target time used in step S400 is set as a transmission start time. Then the time determination and addition process terminates.

Figure 5A:
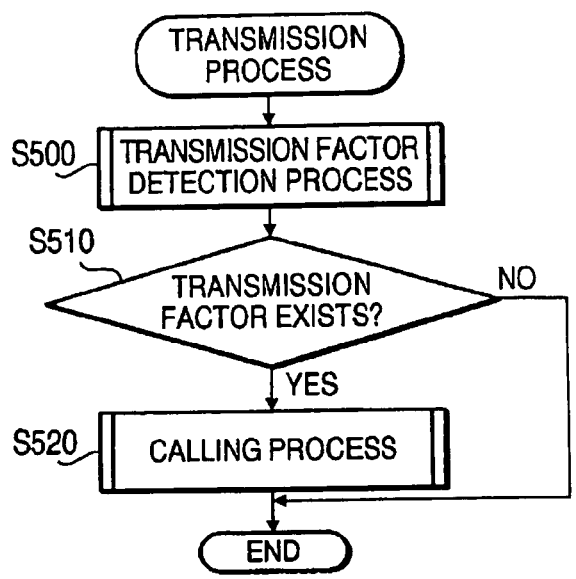
FIG. 5A is a flowchart showing a transmission process.

Next, a transmission process which is initiated at the transmission start time will be described. FIG. 5A is a flowchart showing the transmission process initiated and executed under control of the CPU 81 at the transmission start time. Firstly, in step S500, a transmission factor detection process is performed. Then, in step S510, it is determined whether a transmission factor to be sent to the host device 17 exist or not.

When the transmission factor exists (S510:YES), control proceeds to step S520 where a calling process is performed.

Then, the transmission process terminates. When the transmission factor does not exist (S510:NO), the transmission process terminates.

Figure 5B:
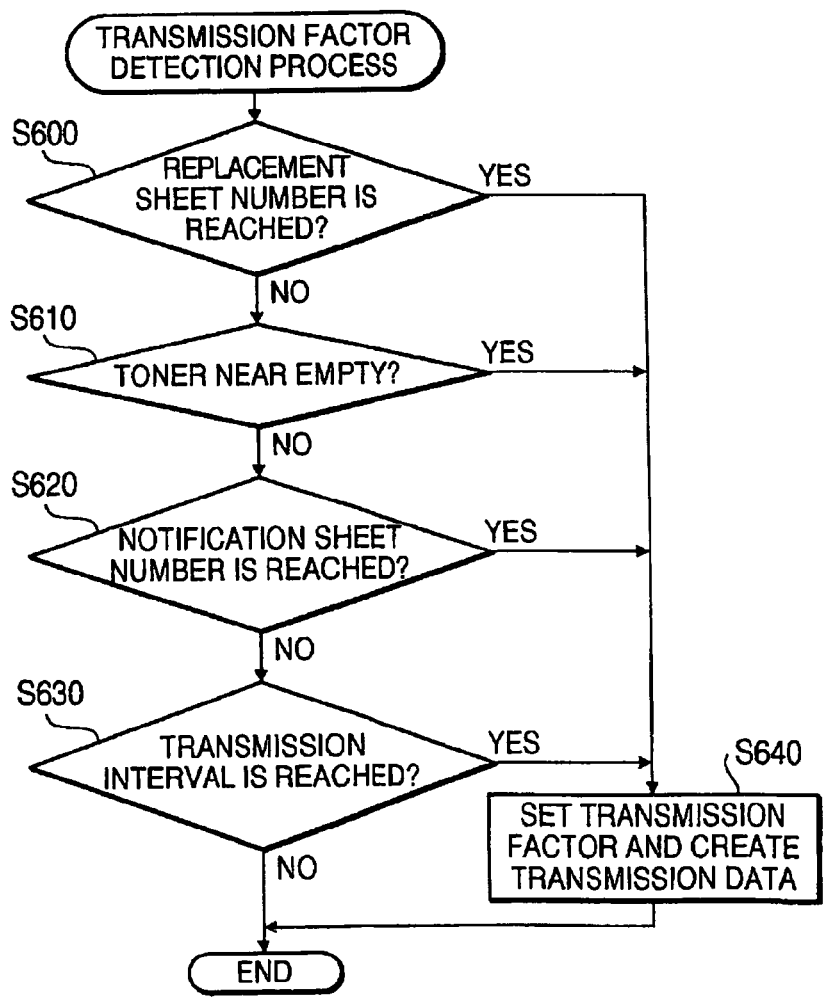
FIG. 5B is a flowchart showing a transmission factor detection process performed in a step of the transmission process of FIG. 5A.

FIG. 5B is a flowchart showing in detail the transmission factor detection process performed in step S500 of FIG. 5A. Firstly, in step S600, it is determined whether the number of sheets which have been printed in the facsimile device 1 reaches the replacement sheet number. When the number of sheets which have been printed in the facsimile device 1 reaches the replacement sheet number (S600:YES), control proceeds to step S640. When the number of sheets which have been printed in the facsimile device 1 does not reach the replacement sheet number (S600:NO), control proceeds to step S610.

In step S610, it is determined whether the toner in the toner cartridge 33 is in a near empty state or not. When the toner is in the near empty state (S610:YES), control proceeds to step S640. When the toner is not in the near empty state (S610:NO), control proceeds to step S620.

In step S620, it determined whether the number of sheets which have been printed in the facsimile device 1 reaches the notification sheet number. When the number of sheets which have been printed in the facsimile device 1 reaches the notification sheet number (S620:YES), control proceeds to step S640. When the number of sheets which have been printed in the facsimile device 1 does not reach the notification sheet number (S620:NO), control proceeds to step S630.

Instep S630, it is determined whether a transmission interval is elapsed or not. When the transmission interval is elapsed (S630:YES), control proceeds to step S640. When the transmission interval is not elapsed (S630:NO), the transmission factor detection process terminates.

In step S640, the transmission factor detected in at least one of steps S600, S610, S620, and S630 is packed into transmission data. The transmission data created in step S640 containing management information including a version number of application program of a calling process (shown in FIG. 6A), the product number of the facsimile device 1, a serial number of the facsimile device 1, the customer number, a name of a caller, a telephone number of the caller, a telephone number of the host device 17, the transmission factors, the number of sheets printed in the facsimile device 1, a date of transmission, the set value of the notification sheet number and the set value of the transmission intervals.

Figure 6A:
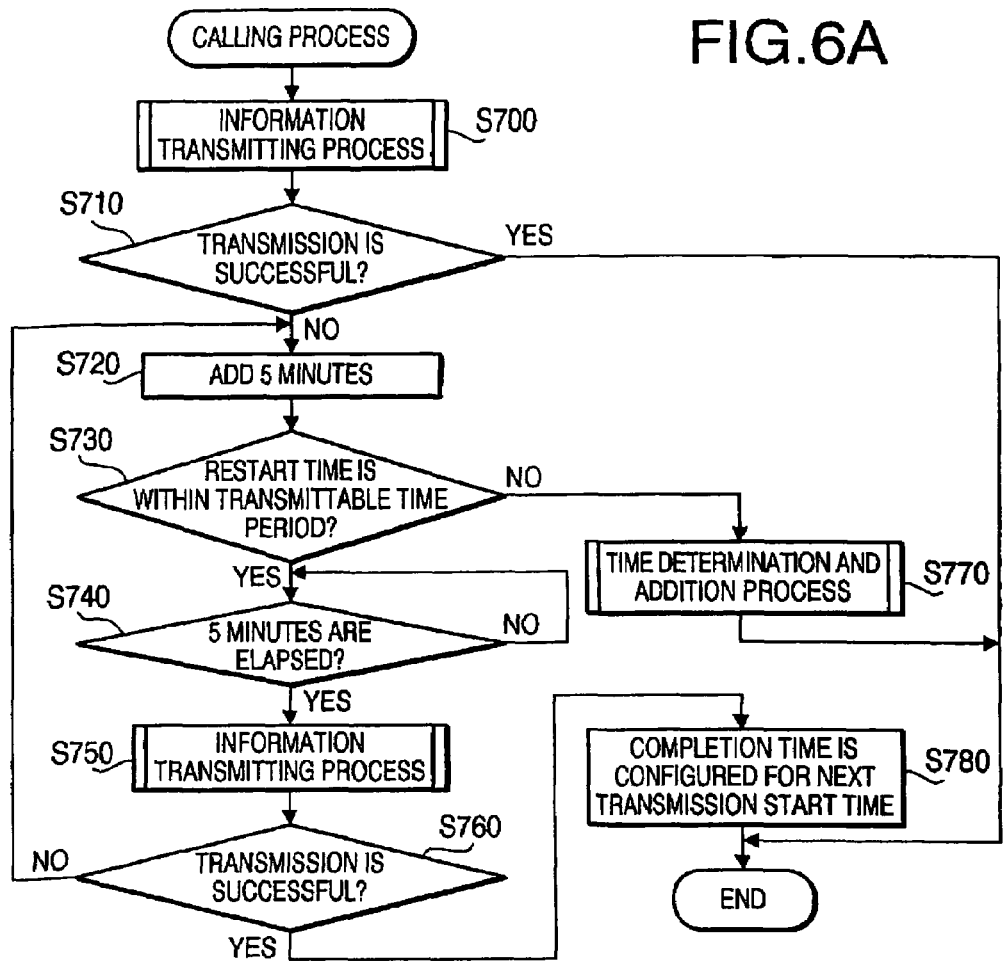
FIG. 6A is a flowchart illustrating a calling process executed in a step of the transmission process of FIG. 5A.
Figure 6B:
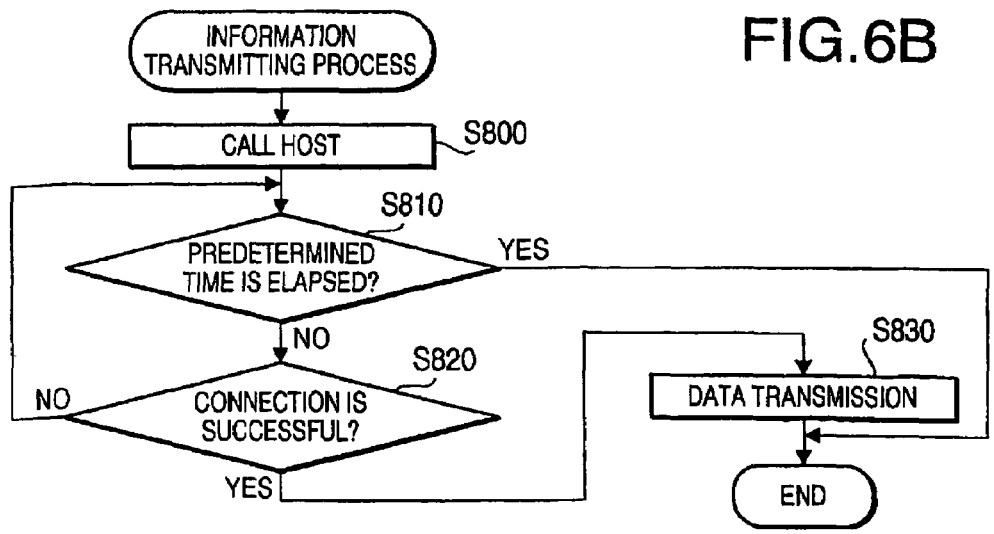
FIG. 6B is a flowchart illustrating an information transmitting process executed in a step of the calling process of FIG. 6A.

Next, the calling process performed in step S520 in FIG. 5A will be described with reference to FIGS. 6A and 6B. FIG. 6A is a flowchart illustrating the calling process. Firstly, in step S700, an information transmitting process which is shown in detail in FIG. 6B is performed. In the information transmitting process, a process for calling the host device 17 is initiated in step S800. Next, in step S810, it is determined whether a predetermined time is elapsed or not. When the predetermined time is elapsed (S810:YES), the information transmitting process terminates. When the predetermined time is not elapsed (S810:NO), control proceeds to S820.

In step S820, it is determined whether the facsimile device 1 is connected to the host device 17 or not. When the facsimile device 1 is not connected to the host device 17 (S820:NO), control returns to step S810. When the facsimile device 1 is connected to the host device 17 (S820:YES), control proceeds to step S830. In step S830, the transmission data including the transmission factors is transmitted to the host device 17. Then, the information transmitting process terminates.

Next, in step S710, it is determined whether the information transmitting process is successfully completed or not. When the information transmitting process is successfully completed (S710:YES), the calling process terminates. When the information transmitting process is not successfully completed (S710:NO), control proceeds to step S720.

In step S720, 5 minutes are added to the transmission start time to restart the calling process 5 minutes later. Next, in step S730, it is determined whether the transmission start time reset in step S720 is within the transmittable time period. When the transmission start time is within the transmittable time period (S730:YES), control process to step S740. When the transmission start time is not within the transmittable time period (S730:NO), control process to step S770 where the time determination and addition process shown in FIG. 4A is performed.

In step S740, it is determined whether a current time reaches to the transmission start time reset in step S720 (i.e., it is determined whether 5 minutes are elapsed or not). When a current time does not reach to the transmission start time (S740:NO), step S740 is repeated. When a current time reaches to the transmission start time (S740:YES), control proceeds to step S750 where the information transmitting process shown in FIG. 6B is performed.

Next, in step S760, it is determined whether the information transmitting process in step S750 is successfully completed or not. When the information transmitting process is successfully completed (S760:YES), control proceeds to step S780. When the information transmitting process is not successfully completed (S760:NO), control returns to step S720.

In step S780, a time at which the information transmitting process is completed is set as a next transmission start time. Then, the calling process terminates.

According to the embodiment of the invention, a time at which the user performs the initial stetting process is set as the transmission start time. That is, when the user performs the initial setting process, the transmission start time is automatically configured at a current time. Therefore, the transmission time can be set on a random basis. The transmission start times are decentralized.

Therefore, according to the embodiment, it is prevented that data transmissions from the facsimile devices to the host device are centered on a specific time. The data transmission between the facsimile device and the host device can be reliably completed.

It is noted that the transmittable time period can be easily changed by making settings using the operation unit 93.

In the time determination and addition process, the appropriate addition times stored in the ROM 83 are used to bring the transmission start time in the transmittable time period, the burden to determine the transmission start time on the control unit 80 is decreased.

Since the information transmitting process (S700) is repeated until the process is successfully completed, transmission data is securely transmitted to the host device 17.

When the information transmitting process is successfully completed, the time at which the information transmitting process is successfully completed is adopted as the transmission start time. Therefore, the possibility that a next information transmitting process is successfully performed is increased.

Since the calling process includes step S730 to determined whether the transmission start time reset in step S720 is within the transmittable time period, the transmission data can be securely transmitted to the host device 17 within the transmittable time period.

When one of the addition times is selected from the table stored in the ROM 83, the addition times are selected in a decreasing order of length of time. That is, the addition time having a larger value has higher priority. Therefore, the transmission start times are decentralized more reliably.

Usage conditions of consumable items and exchangeable components such as the toner cartridge and photoconductive drum in the facsimile device 1 are transmitted to the host device 17, the host device 17 can know lifetime of the consumable items and the exchangeable components.

According to the embodiment, a telephone traffic jam can be prevented, and the data transmission can be performed within a low phone rate period.

Although the present invention has been described in considerable detail with reference to certain preferred embodiments thereof, other embodiments are possible.

Figure 7:
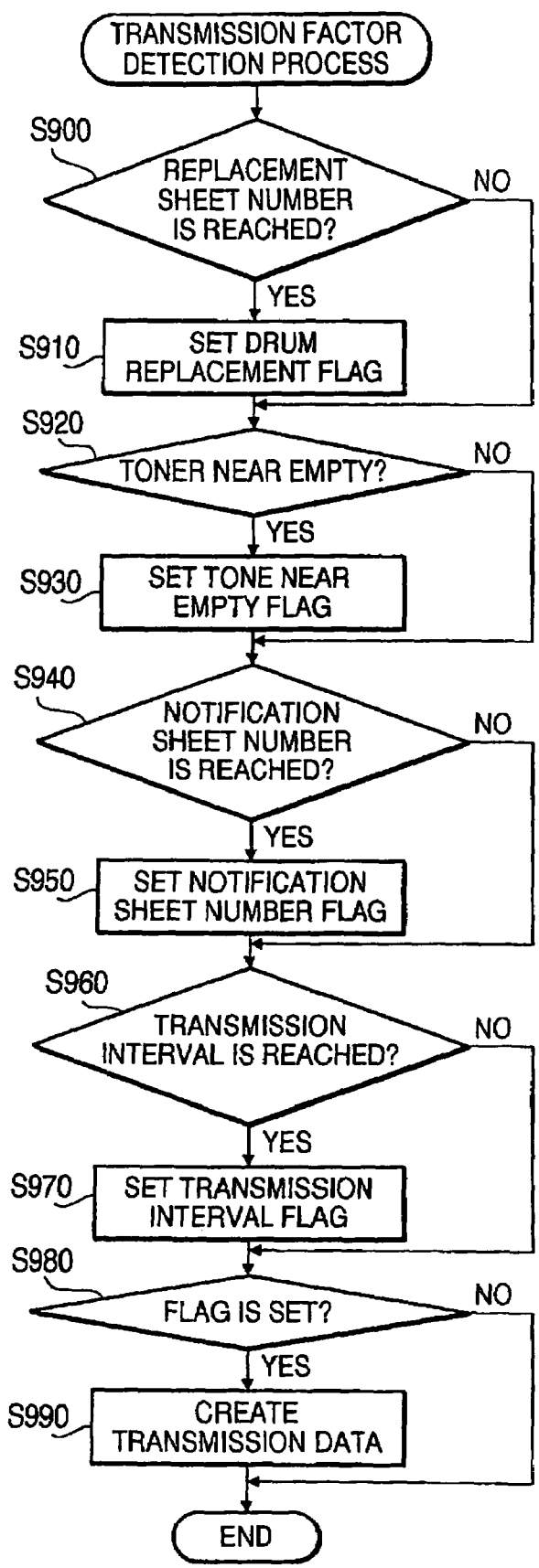
FIG. 7 shows a flowchart illustrating a variation of the transmission factor detection process of FIG. 5B.

FIG. 7 shows a flowchart illustrating a variation of the transmission factor detection process of FIG. 5B. In the process shown in FIG. 5B, if one of the transmission factors is detected, remaining transmission factors are not checked. By contrast, the process shown in FIG. 7 enables to check all of the transmission factors before a process for creating the transmission data is performed.

More specifically, in step S900, it is determined whether the number of sheets which have been printed in the facsimile device 1 reaches the replacement sheet number. When the number of sheets which have been printed in the facsimile device 1 reaches the replacement sheet number (S900:YES), control proceeds to step S910. When the number of sheets which have been printed in the facsimile device 1 does not reach the replacement sheet number (S900:NO), control proceeds to step S920. In step S910, a drum replacement flag is set to 1 to indicate that the replacement of the drum is necessary.

In step S920, it is determined whether the toner in the toner cartridge 33 is in a near empty state or not. When the toner is in the near empty state (S920:YES), control proceeds to step S930. When the toner is not in the near empty state (S920:NO), control proceeds to step S940. In step S930, a toner near empty flag is set to 1 to indicate that the toner is in the near empty state.

In step S940, it determined whether the number of sheets which have been printed in the facsimile device 1 reaches the notification sheet number. When the number of sheets which have been printed in the facsimile device 1 reaches the notification sheet number (S940:YES), control proceeds to step S950. When the number of sheets which have been printed in the facsimile device 1 does not reach the notification sheet number (S940:NO), control proceeds to step S960. In step S950, a notification sheet number flag is set to 1 to indicate that the number of sheets which have been printed in the facsimile device 1 reaches the notification sheet number.

In step S960, it is determined whether a transmission interval is elapsed or not. When the transmission interval is elapsed (S960:YES), control proceeds to step S970. When the transmission interval is not elapsed (S960:NO), control proceeds to step S980. In step S970, a transmission interval flag is set to 1 to indicate that the transmission interval is elapsed.

In step S980, it is determined whether at least one of the drum replacement flag, the toner near empty flag, the notification sheet number flag and the transmission interval flag is set or not. When at least one of the flags is set (S980:YES), control proceeds to step S990. When all of the flags are not set at all (S980:NO), the transmission factor detection process terminates. Similarly to step S640, in step S990, the transmission data is created to include the transmission factors detected in steps S900-S970 and the various items.

With this configuration, all of the factors detected in steps S900-S970 can be included in the transmission data.

Although in the above mentioned embodiment, the facsimile device 1 is connected to the host device 17 via the telephone lines, the connection between the facsimile device and the host device can also be attained through various types of networks such as the Internet.

In this embodiment, the management information (the transmission data) includes information concerning the consumables items and the exchangeable components of the facsimile device. However, other types of information regarding the facsimile device may be included in the management information. For example, if the facsimile device is installed in a store, the sales report of the store may be included in the management information.

In the above mentioned embodiment, the user performs the initial setting process using the operation unit 93. However, the initial setting process may be performed by an operator during the manufacturing process of the facsimile device, or by an engineer at the site at which the facsimile device is installed.

Although in the above mentioned embodiment the transmittable time period is designated by the user in the initial setting process shown in FIG. 3B, a predetermined transmittable time period may be used without requiring the user to input the transmittable time period.

In the time determination and addition process shown in FIG. 4A, the addition time is added to the determination target time. However, a predetermined time may be subtracted from the determination target time to bring the determination target time within the transmittable time period.

With regard to the decentralization of the transmission start times, the following comparative scheme is now considered. In this comparative scheme, the transmission start time is determined using random numbers so as to decentralize the transmission start times. However, even if this scheme is adopted, the transmission start times among the facsimile devices become the same at a certain probability because in this case the transmission start time is determined in accordance with a predetermined rule in each of the facsimile device.

By contrast, in the above mentioned embodiment, the time at which the initial setting process is completed is adopted as the transmission start time to decentralize the transmission start times. With this configuration, the transmission start times can be randomly determined. According to the embodiment of the invention, the possibility that the transmission start times become the same can be considerably reduced relative to the comparative scheme where the transmission start time is determined using random numbers.

Such an advantage of the embodiment is further enhanced in a case where one operator performs the initial setting processes for the plurality of facsimile devices one by one at a shipping time. The reason is that in this case one operator performs the initial setting process and therefore the transmission start times of the facsimile devices are securely shifted with respect to each other by a few minutes.

In the above mentioned embodiment, one transmittable time period is set in the facsimile device. However, the present invention can also be applied to a case where a plurality of kinds of transmittable tame periods (having different start times and/or lengths) are set in the facsimile device.

In the above mentioned embodiment, the data transmission between the host device and the facsimile device is described by way of example. However, the above mentioned configuration for randomly determining the transmission start time may be applied to various types of communication devices configured to transmit the management information to the host device.

The device and method according to the present invention can be realized when appropriate programs are provided and executed by a computer. Such programs may be stored in recording medium such as a flexible disk, CD-ROM, memory cards and the like and distributed. Alternatively or optionally, such programs can be distributed through networks such as the Internet.

The present disclosure relates to the subject matter contained in Japanese Patent Application No. 2003-307229, filed on Aug. 29, 2003, which is expressly incorporated herein by reference in its entirety.

What is claimed is:

1. A communication device connected to a network, comprising:
   a target time setting system that sets a determination target time to a time at which a predetermined setting operation is performed;
   a determining system that determines whether the determination target time is within at least one certain transmittable time period;
   a transmission time setting system that sets a transmission start time to the determination target time when the determining system determines that the determination target time is within the certain transmittable time period, and shifts the determination target time so that the determination target time is within the certain transmittable time period when the determining system determines that the determination target time is not within the certain transmittable time period; and
   a transmitting system that starts to communicate with an external device through the network at the transmission start time.

2. The communication device according to claim 1, wherein when the determining system determines that the determination target time is not within the certain transmittable time period, the transmission time setting system operates to add and/or subtract a time value to and/or from the determination target time so that the determination target time is within the certain transmittable time period.

3. The communication device according to claim 1, wherein when the determining system determines that the determination target time is not within the certain transmittable time period, the transmission time setting system repeats following time shifting operations:
   (a1) selecting one of predetermined time values;
   (a2) adding and/or subtracting the selected one of the predetermined time values to and/or from the determination target time to obtain a changed determination target time; and
   (a3) passing the changed determination target time to the determining system to determine whether the changed determination target time is within the certain transmittable time period,
   wherein when the changed determination target time is within the certain transmittable time period, the time shifting operations are stopped.

4. The communication device according to claim 3, wherein the predetermined time values include a plurality of time values having different lengths,
   wherein, in the time shifting operations, the predetermined time values are selected in decreasing order of length of time.

5. The communication device according to claim 3, wherein the predetermined time values are related to a length of the certain transmittable time period.

6. The communication device according to claim 3, wherein the predetermined time values are prepared for each of various lengths of certain transmittable time periods.

7. The communication device according to claim 1, wherein when communication between the transmitting system and the external device is not successfully completed, the transmitting system retries to communicate with the external device after a certain time is elapsed.

8. The communication device according to claim 7, wherein when the communication between the transmitting system and the external device is successfully completed after the certain time is elapsed, the transmitting system changes the transmission start time to a time at which the communication is successfully completed.

9. The communication device according to claim 8, wherein the transmitting system operates so that the changed transmission start time is within the certain transmittable time period.

10. The communication device according to claim 1, wherein the predetermined setting operation includes a initial setting operation for entering initial settings into the communication device.

11. The communication device according to claim 1, wherein the certain transmittable time period is entered by a user into the communication device.

12. The communication device according to claim 1, wherein the certain transmittable time period is preprogrammed in the communication device.

13. The communication device according to claim 1, wherein the transmitting system transmits management information to the external device.

14. The communication device according to claim 13, wherein the communication device includes a facsimile device,
   wherein the management information includes usage conditions of consumable items and/or exchangeable components of the facsimile device.

15. The communication device according to claim 1, wherein the network includes a telephone line.

16. The communication device according to claim 1, wherein the certain transmittable time period includes a low phone rate period.

17. A computer implemented method of communicating with an external device, the method comprising the steps of:
   setting a determination target time to a time at which a predetermined setting operation is performed;
   determining whether the determination target time is within a certain transmittable time period;
   setting a transmission start time to the determination target time when it is determined in the determining step that the determination target time is within the certain transmittable time period;
   shifting the determination target time so that the determination target time is within the certain transmittable time period when it is determined in the determining step that the determination target time is not within the certain transmittable time period; and
   starting to communicate with the external device through the network at the transmission start time.

18. The method according to claim 17, wherein the shifting step includes time shifting operations of:
   selecting one of predetermined time values;
   adding and/or subtracting the selected one of the predetermined time values to and/or from the determination target time to obtain a changed determination target time; and passing the changed determination target time to the determining step to determine whether the changed determination target time is within the certain transmittable time period, wherein the time shifting operations are performed when it is determined in the determining step that the determination target time is not within the certain transmittable time period, wherein when the changed determination target time is within the certain transmittable time period, the time shifting operations are stopped.

19. The method according to claim 18, wherein the predetermined time values include a plurality of time values having different lengths, wherein, in the time shifting operations, the predetermined time values are selected in decreasing order of length of time.

20. A computer-readable storage medium that stores a computer-executable program for communication with an external device, the program comprising:

instructions for setting a determination target time to a time at which a predetermined setting operation is performed;

instructions for determining whether the determination target time is within a certain transmittable time period;

instructions for setting a transmission start time to the determination target time when it is determined that the determination target time is within the certain transmittable time period;

instructions for shifting the determination target time so that the determination target time is within the certain transmittable time period when it is determined that the determination target time is not within the certain transmittable time period; and instructions for starting to communicate with the external device through the network at the transmission start time.

21. The computer-readable storage medium according to claim 20, wherein the instructions for shifting the determination target time include:

instructions for selecting one of predetermined time values;

instructions for adding and/or subtracting the selected one of the predetermined time values to and/or from the determination target time to obtain a changed determination target time; and instructions for determining whether the changed determination target time is within the certain transmittable time period, wherein the instructions for shifting the determination target time are performed when it is determined that the determination target time is not within the certain transmittable time period, wherein when the changed determination target time is within the certain transmittable time period, the instructions for shifting the determination target time are stopped.

22. The computer-readable storage medium according to claim 21, wherein the predetermined time values include a plurality of time values having different lengths, and wherein, in the instructions for shifting the determination target time, the predetermined time values are selected in decreasing order of length of time.

* * * * *